United States Patent [19]

Bumgarner

[11] Patent Number: 5,472,072
[45] Date of Patent: Dec. 5, 1995

[54] FILTERING BREATHABLE PROTECTIVE BOOT FOR A TELESCOPING BICYCLE SUSPENSION

[76] Inventor: Randal L. Bumgarner, P.O. Box 8364, Durango, Colo. 81301

[21] Appl. No.: 86,730

[22] Filed: Jul. 2, 1993

[51] Int. Cl.⁶ ........................................ F16F 9/38
[52] U.S. Cl. ................. 188/322.12; 277/212 FB; 280/276
[58] Field of Search .............. 188/322.12; 74/18, 74/18.2; 280/276; 277/212 FB

[56] References Cited

U.S. PATENT DOCUMENTS

| | | |
|---|---|---|
| 2,155,259 | 4/1939 | Dickson . |
| 2,163,255 | 6/1939 | Binder et al. .............. 188/322.12 |
| 2,768,836 | 10/1956 | Hilber ........................ 280/276 |
| 3,369,411 | 2/1968 | Hines . |
| 3,669,575 | 6/1972 | Beckerer . |
| 3,830,083 | 8/1974 | Hadick et al. . |
| 3,927,576 | 12/1975 | Colletti . |
| 4,002,079 | 1/1977 | Hall . |
| 4,058,018 | 11/1977 | Lauper . |
| 4,114,460 | 9/1978 | Oto . |
| 4,235,427 | 11/1980 | Bialobrzeski . |
| 4,456,269 | 6/1984 | Krude et al. . |
| 4,529,213 | 7/1985 | Goodman . |
| 4,828,237 | 5/1989 | Neff . |
| 4,989,884 | 2/1991 | Goodman ................ 277/212 FB |
| 4,989,884 | 2/1991 | Goodman . |

FOREIGN PATENT DOCUMENTS

| | | |
|---|---|---|
| 518733 | 4/1953 | Belgium . |
| 942043 | 1/1949 | France . |
| 1374700 | 11/1963 | France ........................ 277/212 FB |
| 877559 | 4/1953 | Germany . |
| 1041742 | 10/1958 | Germany . |
| 1500986 | 11/1969 | Germany . |
| 2125117 | 12/1972 | Germany . |
| 2721121 | 11/1977 | Germany . |
| 526508 | 5/1955 | Italy . |
| 189281 | 8/1991 | Japan . |
| 312019 | 2/1956 | Switzerland . |
| 671109 | 4/1952 | United Kingdom . |
| 679960 | 9/1952 | United Kingdom . |
| 1008997 | 11/1965 | United Kingdom . |

*Primary Examiner*—Matthew C. Graham
*Attorney, Agent, or Firm*—Kenton L. Freudenberg; Maxwell C. Freudenberg

[57] ABSTRACT

A breathable protective filtering boot structure for a telescoping bicycle fork suspension comprises a generally cylindrical bellows-like rubber-like boot for each of a pair of fork legs which telescope along parallel vertical axes. Each boot is secured at its upper end to a male leg member and depends to form a variable volume boot chamber around the telescoping junction of the male and female leg members. The lower end of the boot has a flat annular shoulder spaced axially from and facing the top end of the female member with a cylindrical skirt depending from the boot shoulder for securing the boot to the upper end of the female leg member. A short portion of the skirt, with vent apertures between the shoulder and the female member facing away from the wheel space of the fork, encircles a small filter confining cavity at the lower end of the boot chamber. The filter cavity contains a replaceable annular porous resilient compressed oil-impregnated filter element which is held compressed axially between the boot shoulder and the top end of the female member and is held compressed radially between the apertured skirt portion and the surface of the male member to keep the vent apertures continuously covered and to wipe off and lubricate the surface of the male member. The velocity of air and liquid moving out through the filter during operation of the suspension keeps the outer filter surfaces at the vent apertures free of contaminants.

20 Claims, 5 Drawing Sheets

5,472,072

FILTERING BREATHABLE PROTECTIVE BOOT FOR A TELESCOPING BICYCLE SUSPENSION

BACKGROUND OF THE INVENTION

In recent years the art of bicycle making has expanded greatly in the area of bicycles which are intended for use off paved roads. These bicycles have become known as "mountain bikes" or "all terrain bikes." Because these bicycles are widely used on rough surfaces, The use of suspension to absorb the bumps and impacts of riding has become increasingly popular. A very common type of suspension is built into the fork and comprises a pair of parallel telescoping legs secured together by a fork crown, with the legs extending downwardly on opposite sides of the front wheel. These legs are each typically comprised of two generally concentric and coaxial tubular members with one male member sliding axially within the female other member to allow compression of the leg in response to an increased axial load. Most commonly, the telescoping mechanism is oriented so that the outer or female leg member is the lower leg member and the inner or male leg member is the upper leg member. The sliding movement of each leg is typically controlled means of a sealed chamber of compressed air, coil springs or elastomer material positioned between the tubular members to resist relative axial movement of the members in compression. Damping of the movement may also be controlled by additional friction created by hydraulic or mechanical means to resist axial movement in either compression or extension.

An outer surface port, of the male member of each telescoping leg is typically polished to slide smoothly axially within the female of the leg and is often at least partially exposed as it slides into and out of the female leg portion. At the point where this male member enters the female tube, an annular seal typically surrounds the male member to prevent entry of contaminants into the interior of the female telescoping tube member. The effectiveness of the seal can be dependent on the uniformity or smoothness of the surface of the male portion. Particularly in the case of a suspension using air springs, hydraulic damping, or both, where containment of the air or hydraulic fluid is necessary, the function of the seals may be crucial to assure appropriate compressive resistance in the fork structure.

When unprotected, the polished surface portion of the male leg member is susceptible to physical damage by scratching, abrasion or erosion. This can occur if, for example, a rider loses his or her balance and the bicycle falls over, hitting the ground and allowing the polished surface to comes into contact with a rock. Also, in dusty or muddy conditions the exposed outer surface of the male leg can attract dust or become covered with water, mud or a combination of the these three elements, all of which may have the effect of creating abrasion between the respective portions of the fork leg or the seal between the legs or which may increase friction between the sliding portions of the two legs. The moisture from water and mud pose the additional threat of causing rust on the steel surface of the male fork leg with a resultant decrease in the smoothness of the polish of the surface.

It has long been known that the dependability and longevity of the function of suspension forks can be increased by covering the sliding portion of the legs with a rubber accordion-like "boot" to protect the polished surface of the male fork member from physical damage, such as scratching, and to help limit the exposure of the polished surface and any seals to solid and liquid contaminants such as dust, dirt, mud and water.

To function most effectively at keeping contaminants away from the sliding mechanism such a boot is fitted to form an airtight seal around the movable portion of the fork leg. However, having a boot which is sealed airtight, can create several additional problems. If air which is sealed inside the boot has a sufficient moisture content, the moisture may cause rusting of steel parts exposed to the moisture. Additionally, undesirable condensation may occur within the boot, creating the potential for rust or an increase in operating friction as described above, as well as increasing possibility of that trapped water may work its way past the annular seals and into the interior of the fork itself. Further, as the fork leg is moved through its range of motion in compression and extension, the internal volume within the boot is increased and decreased. The air contained within the boot tends to resist any change in volume and can cause the flexible boot to bulge outwardly or collapse inwardly during operation. In bulging outwardly the folds of the bellows may come into contact with a tire cause rolling friction or damage to the boot. In collapsing inwardly the folds of the bellows may contact the male leg member creating additional friction in the movement of the suspension itself. The resistance to a change in volume by the air within a boot may also create a sufficient increase or decrease in air pressure within the boot to hinder the movement of the telescoping assembly as the fork leg is extended or compressed. This would most commonly occur where the boot is imperfectly sealed. After expulsion of air as the fork and boot are compressed, a low pressure or semi-vacuum condition is created within the boot as the boot and telescoping assembly begin to re-extend. This internal low pressure condition may cause the boot to become more tightly sealed against the leg members, preventing any entry of air, and thereby preventing or severely hindering the extension of the boot and the telescoping of the leg.

A boot may be provided with breather openings to allow sufficient free air flow to prevent distortion or immobility of the boot. However, this creates the additional problem of allowing dust, water and other such contaminants to gain entry into the moving portions of the fork leg, thereby decreasing the effectiveness of the boot in shielding the moving parts from such contaminants.

SUMMARY OF THE INVENTION

The present invention provides a filtering breathable protective boot and filter means to cover and protect the moving external portions of a telescoping suspension mechanism by creating an enclosed compartment around the moving parts. While air may pass relatively freely between the interior and exterior of the compartment, all moving air passes through an element which essentially fills a portion of the compartment and functions both as an air filter and seal to minimize or prevent any entry of dust or contaminants into the sealed compartment interior. The breathing means is comprises of relatively small ports located low in the boot so that the ports tend to (1) be self cleaning, and (2) promote expulsion of condensation or moisture. An oil impregnated air filter serve two additional functions. First, the filter is sized to remain in contact around the circumference of the sliding male member and is positioned immediately adjacent to the seal through which the male leg member passes into the female leg member. Because the filter element constantly "wipes" the surface of the moving male leg member, the filter also serves to help trap what few dust particles or similar contaminants may have entered the boot to further prevent such contaminants from reaching the annular suspension seals. Since the filter element is oil impregnated, the wiping action also helps maintain the lubrication of the outer surface of male member. Oil may be replenished in the filter element through the breathing or vent apertures or ports which are covered by the filter element. The doughnut-shaped filter element itself is completely independent of the boot to provide relative easy and inexpensive inspection, service or replacement and may by split to allow its installation and removal without requiring disassembly of the fork structure or removal of the boot.

It is an object of the present invention to provide an expandable breathable boot for the protection of a telescoping joint, in which the boot provides a seal against entry of contaminants.

It is another object of the present invention to provide an expandable boot which is fully breathable without allowing the entry of dust or other contaminants.

It is another object of the present invention to provide an expandable protective boot which is fully breathable and which is capable of forcing out any water or moisture or other liquid contaminants which may enter.

It is a further object of the present invention to provide an expandable protective boot with a filtering breathing means in which the breathing is inexpensive to produce and which is readily serviceable and replaceable.

It is a further object of the present invention to provide an expandable protective boot with a filtering breathing means which also serves to maintain the lubrication of the respective sliding portions of the legs of a telescoping joint.

It is still another object of the present invention to provide an expandable protective boot with a filtering breathing means in which both the boot and filter means are capable of adaptation to a variety of suspension fork devices.

It is a further object of the present invention to provide an expandable protective boot with a filtering breathing means in which the filter means serves as both a filter and as a seal conformable to irregular shapes to insure sealing of the boot.

It is another object of the present invention to provide a breathable expandable boot in which movement of air takes place at relative high velocities through a filtering medium and tends to keep the filtering medium clear of blockage.

It is a further object of the present invention to provide a filtering breathing means for a telescoping joint protective boot structure wherein the breathing vent and filter do not add to the outer radial dimensions of a boot structure enclosing the joint of the telescoping members.

It is a further object of the present invention to provide a filtering breathing means for a telescoping joint protective boot structure wherein the filter means is removable and replaceable without requiring disassembly of the fork structure or removal of the boot itself.

DESCRIPTION OF THE PREFERRED EMBODIMENT

Figure 1:
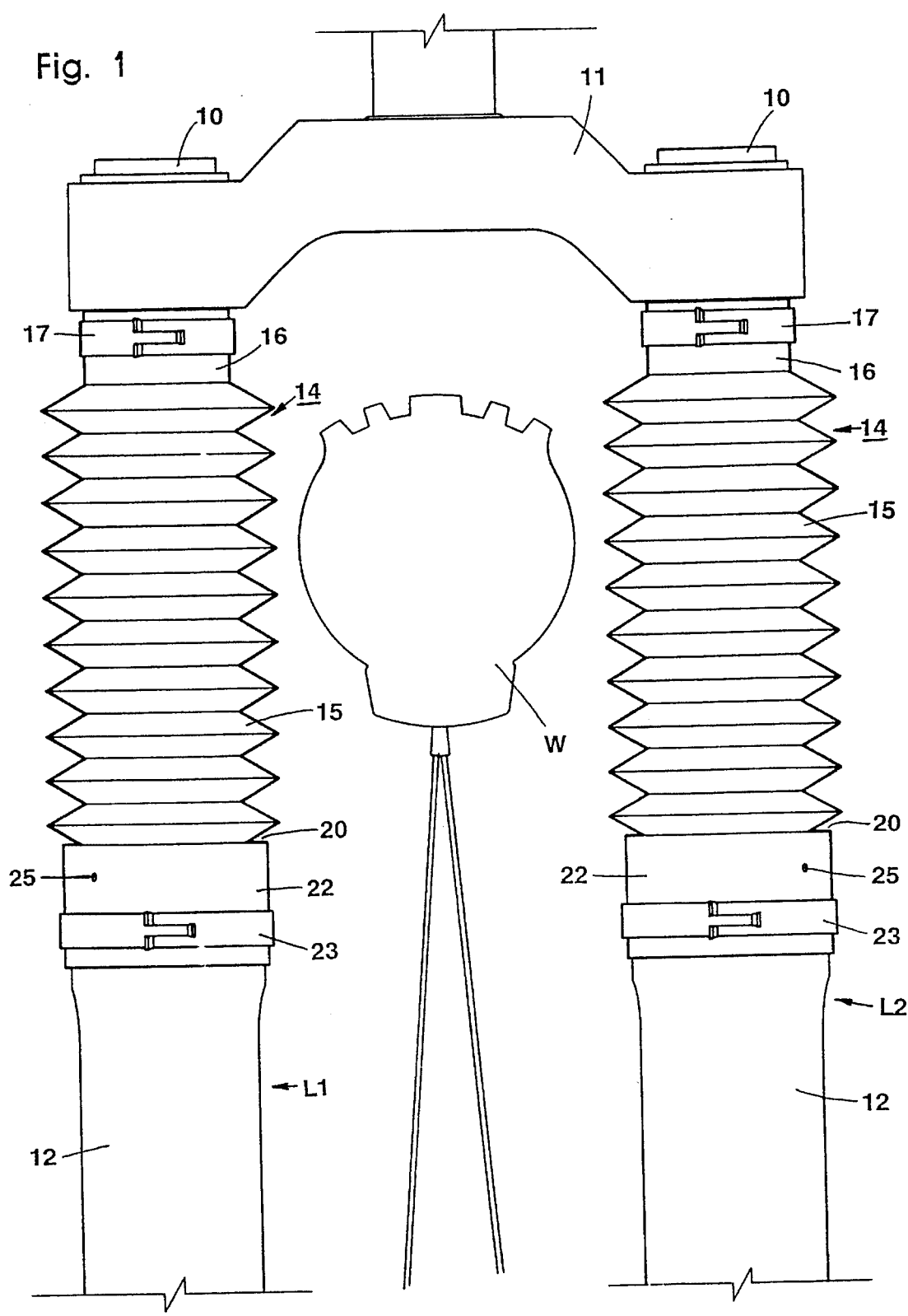
FIG. 1 is a front view of a portion of a typical bicycle fork with two telescoping leg structures and wheel assembly in accordance with the preferred embodiment of the present invention, but with the fork brace for the lower fork leg members omitted and with the wheel shown only partially in outline.

The preferred embodiment of the present invention is intended for use with a bicycle suspension fork structure as seen in FIG. 1 having two respective parallel telescoping legs L1 and L2 located on opposite sides of a wheel assembly W and connected by a cross member or crown 11, each leg having a male portion 10 and a female portion 12 which are coaxial and relatively slidable with respect to one another. Each leg has a boot structure 14 comprising a bellows-like or accordion-pleated boot 15 molded from neoprene or similar rubber-like material having a uniform wall thickness of approximately 0.040 in. (or approximately 1 mm.) An upper or first end of the boot 15 is provided with a cylindrical sleeve 16 having a diameter sized to fit snugly on the male portion 10 of the telescoping fork assembly where it is secured with a spring clamp 17 on the exterior of the sleeve 16. The male fork leg members 10 are rigidly interconnected by a cross member or crown 11.

Figure 2:
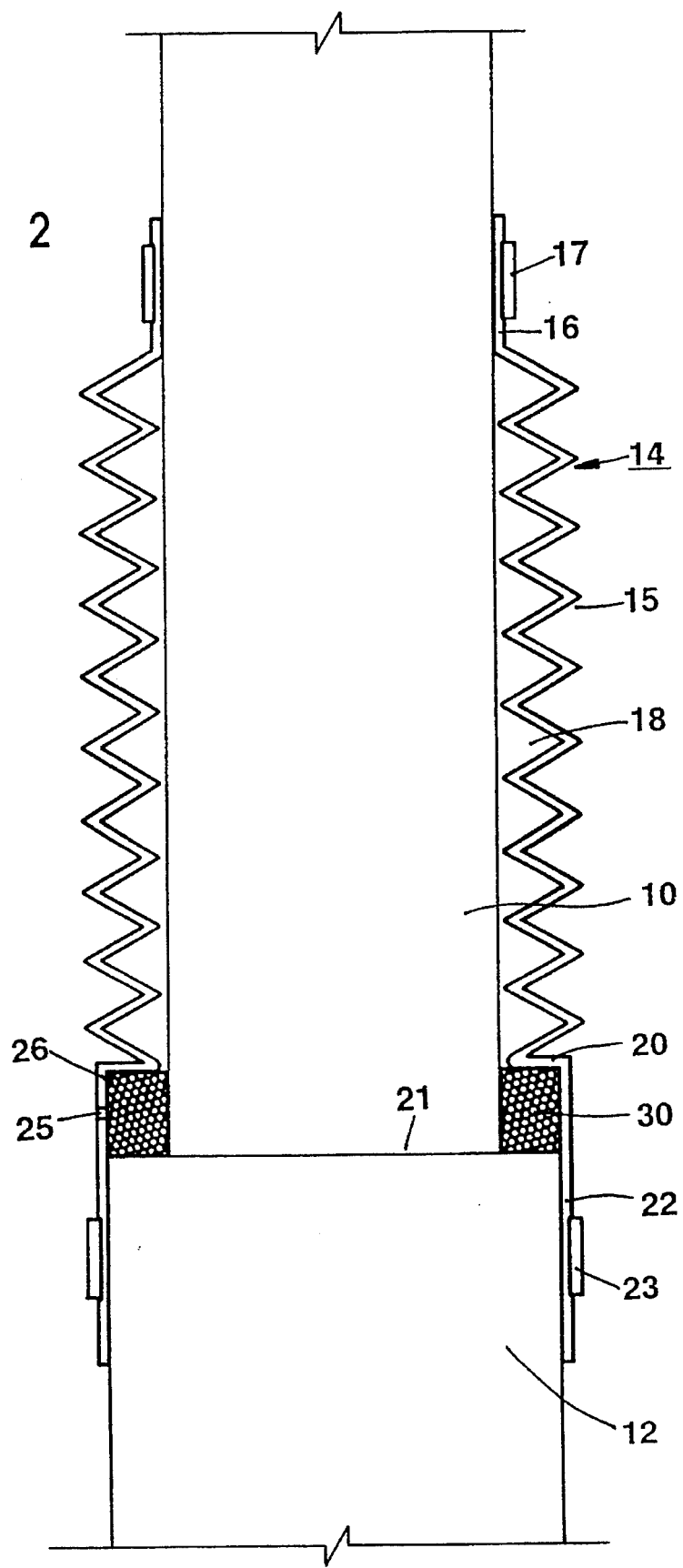
FIG. 2 is a cross sectional view of a portion of a single telescoping leg structure of the preferred embodiment of the present invention.

The boot 15 cooperates with the telescoping leg members 10 and 12 to form a sealed boot chamber 18 above and beyond the end 21 of the female leg member which is vented as described below. The lower end portion of the boot 15 is provided with a flat annular shoulder 20 having an inner flat face extending parallel to and spaced axially from and facing the flat opposing top end face 21 of the female member 12 as seen in FIG. 2. A cylindrical skirt portion 22 of the boot 15 depends from the boot shoulder 20 for securing the lower or second end of the boot to the upper end of the female leg member 12. The cylindrical sleeve or skirt 22 has a diameter sized to fit snugly on the female portion 12 of the fork leg assembly and has sufficient height to allow it to extend over the upper end of the female leg portion 12 to be secured with a spring clamp 23. A short radially outwardly facing wall portion of the skirt 22 has breathing passage means to communicate between the exterior of the boot structure 14 and the interior of boot chamber 18 comprising two vent apertures 25. These apertures lie between the shoulder 20 and the end face of the female member and face away from the fork space for the wheel W. This short apertured portion of the skirt 22 encircles a small filter confining cavity 26 at the lower end of and forming part of the boot chamber 18. Held against axial movement by the shoulder portion 20 and the face 21 within the cavity is an annular replaceable filter element 30. The two breather holes 25 each has a diameter of approximately 0.015 in. (approximately 0.38 mm) and is located in the lower skirt 22 to communicate between the filter cavity 26 and the exterior of the boot. The holes 25 are positioned vertically on the skirt 22 to be near the bottom of the filter cavity 26 and at the bottom of the boot chamber 18 when the boot is installed so that any water which may have accumulated within the boot through condensation or otherwise will tend to be forced from the boot chamber 18 through the filter material in cavity 26. The breather holes are spaced approximately 90 degrees from one another on the circumference of the skirt 22, and the installed boot is oriented so that the two holes are positioned with respect to the telescopic axis away from the bicycle wheel W and respectively at approximately 45 degrees forward and 45 degrees rearward from a line transverse to the direction of travel of the bicycle.

In many common forms of air filters the flow of air is in one direction only. In such a filter a large surface area is desirable for two functions. First, such filters are typically designed to accumulate contaminants until cleaned or replaced and a large surface area insures a reasonable working period for the filter before it becomes clogged. Second, the lower airflow velocity associated with a large surface area decreases the possibility of contaminants being forced completely through the filter material. In the present invention, air moves in both directions through the breather holes of the boot as the fork is moved through its range of travel and the boot is compressed and extended. By making the holes 25 relatively small in relation to the volume of moving air, the velocity of the air exiting on the compression stroke of the telescoping mechanism is effectively increased, thereby tending to keep the holes themselves and portions of the filter element in immediate communication with the holes relatively free of obstruction by the relatively forceful expulsion of air and liquid as the boot is compressed. This high velocity fluid movement tends to expel dirt, dust and other contaminants which have been trapped by the filter element.

Figure 3:
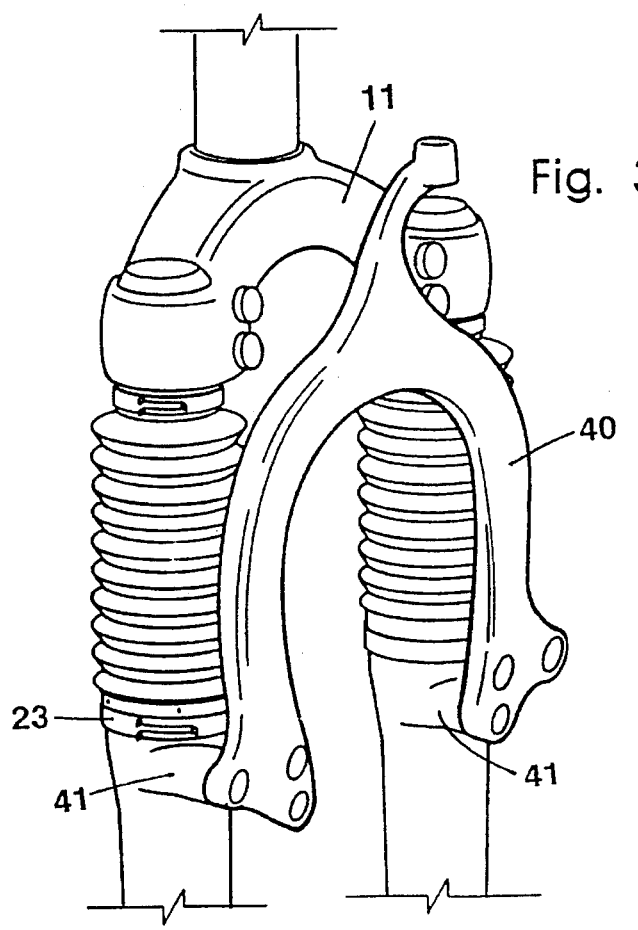
FIG. 3 is a perspective view of the boot protection and filtering structure of the preferred embodiment of the present invention with a fork brace for the female leg members being shown.

As presently manufactured, suspension forks of the type shown in FIG. 3 are fitted with a fork brace 40, a rigid inverted U-shaped member which is typically bolted at fork brace mounts 41 to the respective lower leg members to prevent independent movement of the respective lower leg members and to eliminate various problems such as side-to-side instability of the wheel which may result from such independent movement. In the embodiment of FIG. 3 the fork brace mounts 41 are spaced from the end faces of the female leg members 12 sufficiently to permit use of clips 23 in the manner as seen also in FIG. 2.

Figure 4:
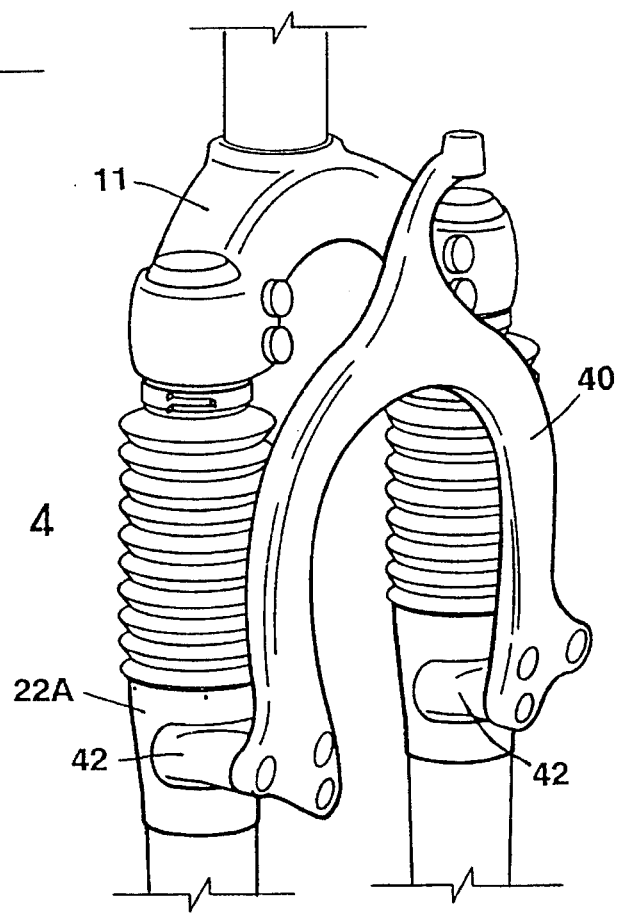
FIG. 4 is a perspective view similar to FIG. 3 of an alternative embodiment in which the fork brace mounts are used to anchor the lower ends of the boots.

An alternative method of affixing the lower end of the boot skirt 22A, as seen in FIG. 4, may be required to accommodate a fork in which the fork brace mounts 42 are positioned at or very near the top end of the lower leg members 12. In such a case the cylindrical lower skirt 22A may be provided with cutouts or apertures whereby the skirt 22A may be stretched over the fork brace mounts 42 to allow protrusion therethrough of the fork brace mounts 42 which in turn also serve to anchor the lower end of the boot against upward movement relative to the female leg members.

While serving primarily as an air filter the filter element 30 also serves as a seal. To the extent that the filter element is tightly pressed and seated against the outer wall of the filter cavity and pressed against the upper surface of the lower fork leg, it is not crucial that the lower skirt 22 itself be sealed around the lower fork leg since any air or water which might enter boot by passing between the skirt and the lower fork leg must pass through the filter element to enter the interior of the boot. It is therefore possible for the skirt 22 or 22A to be self-held or self-secured by means of cooperating portions of the skirt interfitting with portions of the lower fork leg as by providing the above mentioned cutouts for the fork brace mounts 42 in FIG. 4 or by providing an interior lip within the skirt to engage a mating lip or ledge which may exist on the outer surface of the lower fork leg. Also, simple inexpensive means such as tightenable plastic straps commonly known as "zip-ties" may be used in lieu of clips 23.

The sealing characteristic of the filter element 30 of the preferred embodiment will also allow the venting or breathing passage means of the present invention to function through the use of alternative vent means such as may be formed by ribs, grooves or flutes recessed into or protruding above the exterior surface of the female leg to provide one or more longitudinal channels which prevent the lower skirt 2 from fully sealing around the lower leg member. Such ribs, grooves or flutes may be oriented parallel to the telescoping axis and extend from the filter cavity to some point below the lower end of the skirt 22 with the upper ends of such elongated breathing passages sealed by having the filter element pressed against them.

The material of the filter element 30 is of a type of flexible compressible porous foam commonly used for oil bath air cleaners and has a porosity of approximately 100 holes per inch or approximately 40 holes per centimeter. The foam material will tend to expand to its uncompressed size so that when compressed by being confined in the cavity 26 the material tends to expand to conform to and fill the cavity space within which it is confined. When installed the filter element 30 is compressed axially between the boot shoulder 20 and the top end face 21 of the female leg member 12 and is held compressed radially between the apertured skirt portion 22 and the polished sliding surface of the male member 10 to keep the vent apertures continuously covered and to wipe off and lubricate the surface of the male member 10. The velocity of air and liquid moving out through the filter 30 during operation of the suspension is controlled by the size of apertures 25 to keep the outer exposed surfaces of the filter 30 at the vent apertures 25 free of contaminants.

Figure 5:
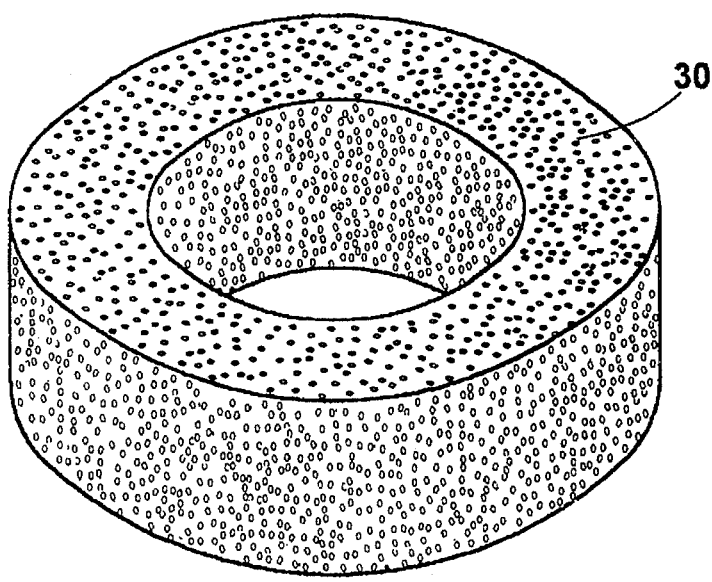
FIG. 5 is a perspective view of the filter element of the preferred embodiment.
Figure 6:
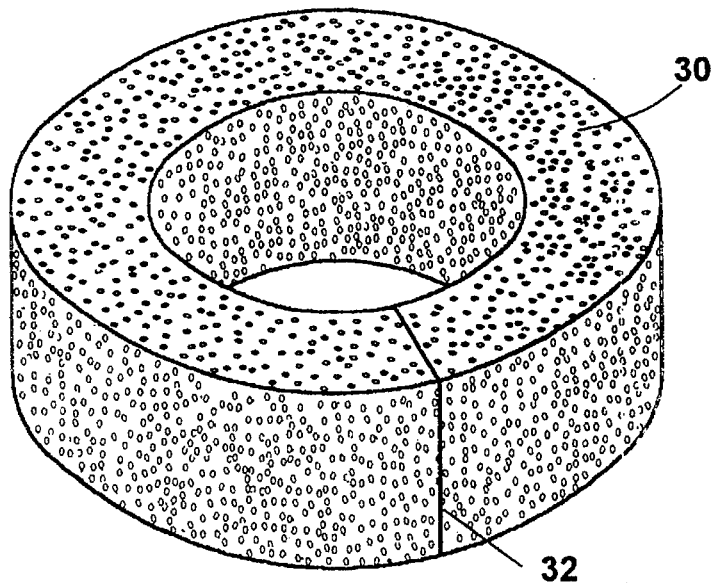
FIG. 6 is a perspective view of a filter element similar to FIG. 6, but with the ring cut and the ends abutting to enable the filter element to be replaced without disassembly of any of the fork structure.
Figure 7:
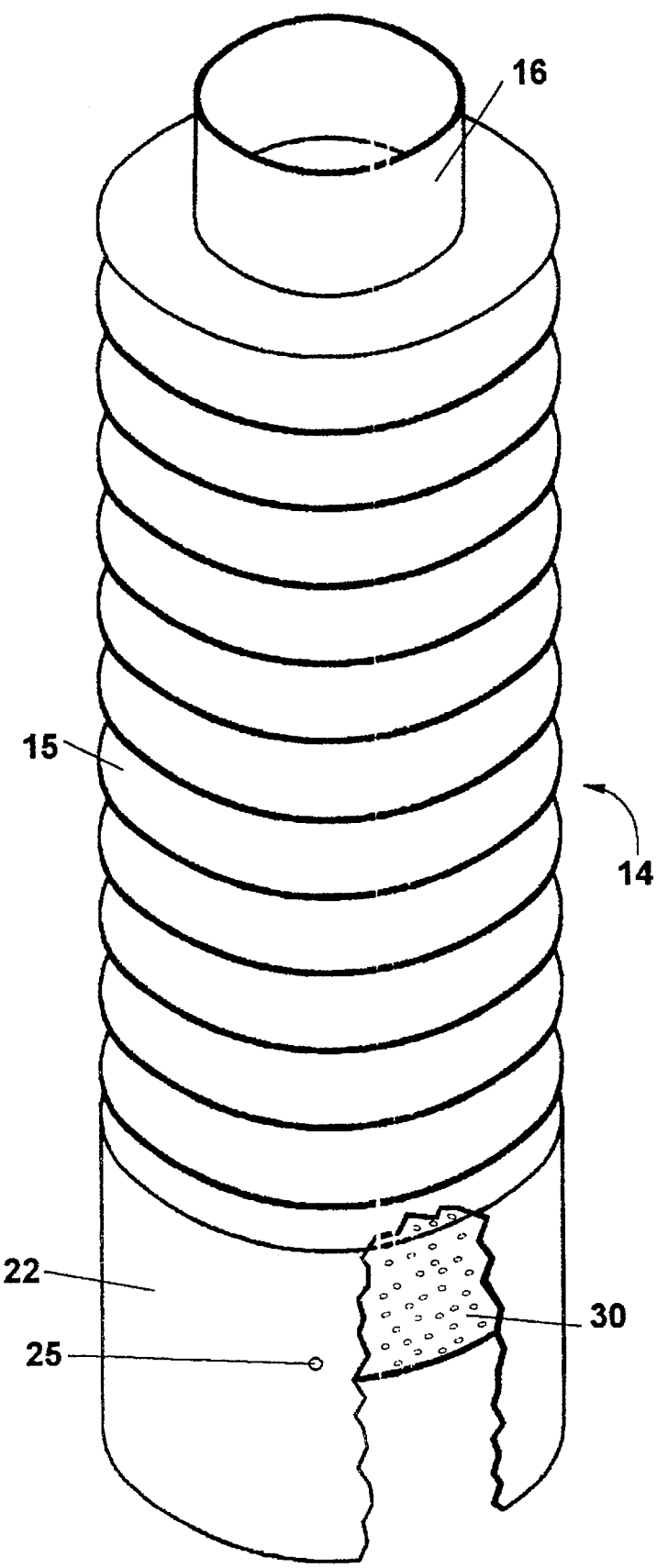
FIG. 7 is a partially cutaway perspective view of the boot of preferred embodiment showing the filter element in place.

As seen in FIG. 5 the filter 30 is a formed into a generally right circular cylindrical shape with a central cylindrical opening, i.e. a "doughnut" shape. Means are provided to keep the filter element axially and radially compressed by having various faces of the filter element 30 pressed against the boot skirt 22, the end face 21 of the female leg member 12, the boot shoulder 20 and the surface of the male leg member 10 at all times. The filter element 30 is made slightly oversize so that it expands to completely fill the space provided for it to insure sealing of the filter cavity 26 at the apertures 25 so that all air passing in either direction through the breather holes 25 due to contraction or expansion of the telescoping structure must pass through the filter element 30. The telescoping structure is protected by means of the boot which is contractible when the male member 10 moves in a first direction into the open end of the female member 12 and is expandable when the male member moves outwardly in the opposite direction. The boot chamber 18 lies beyond the end face 21 in that latter direction, extending between the boot fastening means at the skirt 22 and at the sleeve 16 from the face 21 of the female member to the boot sleeve 16. The exterior diameter of the filter element is just slightly larger than the inner diameter of the filter cavity 26 in the boot member 15. For example, a suitable exterior diameter of the filter element may be 1 9/16 in. (1.5625 in. or approximately 39.69 mm.) for a filter cavity having an inner diameter of 1½ in. (1.5 in. or approximately 38.1 mm.). The axial height of the filter element is just slightly larger than the axial height of the filter cavity 26 the boot member 15 between the boot shoulder 20 and the end face 21 of the female leg member 12. The diameter of the central cylindrical opening of the filter is just slightly smaller than the outer diameter of the male leg member. Along with insuring a sealed fit within the filter cavity, the flexibility of the filter allows it to expand and conform to slight variations in shape of the filter cavity 26, such as may exist where the upper end surface 21 of the lower leg member is sloped, contoured, or otherwise is not perfectly flat. As shown in FIG. 6 providing the filter element 30 with a radial slit 32 allows the filter to be readily installed or removed for service or replacement without requiring any disassembly of the fork structure or removal of the boot itself. Even though the body of the filter element may be severed at the slit 32, the effective continuity of the filter element is unaffected when the filter is confined and compressed within the filter cavity 26 since under compression of the filter element the opposing faces of the slit 32 are forced into full contact with one another.

While the present invention is directed toward telescoping bicycle suspension forks of the type described, its application could be readily adapted to use with any telescoping apparatus. Other variations within the scope of this invention will be apparent from the described embodiment and it is intended that the present descriptions be illustrative of the inventive features encompassed by the appended claims.

What is claimed is:

1. In a telescoping structure having a telescoping joint between two telescoping male and female members which are slidable relative to each other along an axis and are protected by a boot means including a flexible boot which is contractible and expandable along said axis during telescoping operation of the joint said boot having a first end secured to one of said members and a second end secured to the other of said members, said boot having portions between said first and second ends defining a chamber extending from an open end of said female member toward the end of the boot secured to the male member to enclose said joint and to protect the joint against contaminants, the improvement of a breathable contaminant filtering means in said boot means comprising breathing passage means providing at least one vent opening communicating between the exterior of said boot means and said chamber, porous filtering means within said chamber and covering each said vent opening at the inside of said boot, and means including at least a portion of said boot for keeping said filtering means pressed against said breathing passage means to keep said porous filtering means continuously covering each said vent opening during contraction and expansion of the boot as said telescoping members move axially relative to each other whereby air breathed through each said vent opening passes through said filtering means during both expansion and contraction of the boot.

2. A telescoping joint structure according to claim 1 wherein said improvement has each said vent opening located near the open end of the female member and said filtering means is held between and against an axial end face of the female member at said open end and an opposing axial face on a shoulder portion of the boot to prevent axial movement of the filtering means relative to the female member during relative axial sliding movement of said members.

3. A telescoping joint structure according to claim 2 wherein said filtering means is held by said boot in sliding engagement with the surface of the male member as the male member slides relative to the female member.

4. A telescoping joint structure according to claim 1 wherein said boot means comprises at least one such vent opening in the portions of said boot which define said chamber extending from and beyond the open end of said female member toward the end of the boot secured to the male member, and wherein said filtering means and at least a portion of said boot are pressed together for maintaining said porous filtering means continuously covering each said vent opening during contraction and expansion of the boot as said telescoping members move axially relative to each other whereby air breathed through each said vent opening passes through said filtering means during both expansion and contraction of the boot, said filtering means being a ring having on one side a first face for abutting an end face of said female member and on its opposite side a face for abutting an inner shoulder portion on said boot whereby axial movement of the ring relative to the female member and to the vent opening will be limited.

5. A telescoping joint structure according to claim 4 wherein said filtering means is an annular ring of porous flexible material encircling said male member.

6. A telescoping joint structure according to claim 5 wherein said annular ring is impregnated with a lubricant to improve filtering of contaminants from air drawn into the boot through each vent opening and is so located to contact and lubricate the sliding surface of the male member which slides into the female member during telescopic movement of the joint.

7. A telescoping joint structure according to claim 5 for the fork of a bicycle wherein said axis is generally vertical and the open end of the female member faces upwardly and each said vent opening is located near the bottom end of the boot so that liquid within the boot may be expelled from the boot through the filtering means and a vent opening during downward strokes of the male member into the female member.

8. A telescoping joint structure according to claim 4 wherein a cylindrical wall portion of the boot extends axially from an outer periphery of the inner shoulder portion of the boot over a cylindrical end portion of the female member, the inner diameter of the cylindrical wall portion fitting against the outer surface of the cylindrical end portion of the female member, and wherein said ring is a strip of filter material arranged with its ends abutting to form a closed loop and said cylindrical wall portion of the boot may be unsecured from the female member and moved away from the female member to provide sufficient space between the female member and the cylindrical wall portion of the boot to expose space inside the boot chamber at the end of the female member to provide access for insertion or removal of the filter ring strip.

9. A telescoping joint structure according to claim 2 wherein a cylindrical wall portion of the boot extends from the outer periphery of an inner shoulder portion of the boot over an outer peripheral surface of the female member, said cylindrical wall portion having portions providing means interfitting with portions of the female member to be self-holding against axial movement of the cylindrical wall portion at said outer peripheral surface of the female member during telescopic expansion and contraction of the joint.

10. A breathable protecting boot means for preventing contaminating materials from contacting the area of a telescoping joint between two telescoping male and female members which are slidable relative to each other along an axis, said boot means comprising a flexible boot having a wall portion extending between a first end of the boot to be secured to one of said members and a second end of the boot to be secured to the other of said members for enclosing said telescoping joint, said boot wall portion defining a chamber extending from an open end of said female member toward the end of the boot secured to the male member to enclose said joint and to protect the joint against contaminants, said flexible boot being contractible and expandable along said axis, at least one vent opening in said wall portion of said boot to allow said chamber to breathe during relative telescoping movement of said members, a replaceable compressible porous filter ring inside said chamber of said boot and held in compression against the inside of said wall portion of said boot over each said vent opening to keep contaminating material from entering said boot.

11. A protecting boot means according to claim 10 wherein said filter ring has on one side a first face for abutting an end face of said female member and on its opposite side a face for abutting an inner shoulder on said boot whereby the ring will be held against axial movement relative to the female member, said ring having an outer circumferential surface abutting said wall portion of the boot and an inner circumferential surface for abutting a sliding surface of the male member whereby the ring will be maintained in covering relationship over each said vent opening and in sliding engagement with and around the circumference of the male member.

12. A protecting boot means according to claim 11 wherein said faces of the filter ring are parallel flat faces and said circumferential surfaces are concentric cylindrical surfaces.

13. A protecting boot means according to claim 11 wherein said filter is a porous foam material having a porosity of about 100 holes per inch.

14. A protecting boot means according to claim 11 wherein said filter is an oil impregnated foam material.

15. A protecting boot means according to claim 10 wherein each said vent opening is located at the bottom of said chamber during normal use of the telescopic joint whereby liquid within the chamber may be expelled from the boot through the filtering means and a vent opening during compressive strokes of the male member into the female member.

16. A breathable protecting boot means for a bicycle wheel suspension fork for preventing contaminating materials from contacting the area of a telescoping joint between telescoping male and female members of said suspension fork which are slidable relative to each other along an essentially vertical axis, said female member being vertically movable with the wheel and with respect to said male member, said female member having an open upper end mating in sliding engagement with said male member which projects downwardly thereinto, said boot means forming a variable volume chamber enclosing the telescoping joint and comprising a flexible boot which is contractible and expandable along said axis, first fastening means for locating a lower end of said boot at a top portion of said female member, said boot having at least one vent aperture at its lower end near said top portion of the female member, second fastening means for locating an upper end of said boot at a portion of said male member and providing a seal between said upper boot end and said male member, a compressible filter ring within said chamber between said fastening means and overlying each said vent aperture, said boot providing means for holding the filter ring against an axial end face of the open upper end of the female member and for holding the filter ring in compression between the boot and a sliding outer surface of the male member to clean the surface of the male member and maintain the filter ring in sealed position over the vent aperture.

17. A protecting boot means according to claim 16 wherein said boot has two vent apertures on the side thereof away from the wheel and oriented at approximately 45 degrees and 135 degrees, respectively, with respect to the direction of travel of the bicycle.

18. A protecting boot means according to claim 16 wherein the filter ring has separable abutting ends which permit it to be replaced without separating the male and female members.

19. A protecting boot means according to claim 16 wherein the size of each vent aperture provides a velocity of air through the filter to expel dirt off the filter to clean it during compression strokes of the fork suspension.

20. A protecting boot means according to claim 16 wherein the filter ring is a porous flexible oil impregnated material.

* * * * *